(12) United States Patent
Choi et al.

(10) Patent No.: US 10,400,830 B2
(45) Date of Patent: Sep. 3, 2019

(54) SYNCHRONIZER OF TRANSMISSION

(71) Applicants: Hyundai Motor Company, Seoul (KR); Kia Motors Corporation, Seoul (KR)

(72) Inventors: Jae Young Choi, Buson (KR); Jong Yun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 15/831,267

(22) Filed: Dec. 4, 2017

(65) Prior Publication Data

US 2019/0113084 A1 Apr. 18, 2019

(30) Foreign Application Priority Data

Oct. 16, 2017 (KR) .......................... 10-2017-0134225

(51) Int. Cl.
*F16D 23/06* (2006.01)
*F16D 23/02* (2006.01)

(52) U.S. Cl.
CPC ........... *F16D 23/06* (2013.01); *F16D 23/025* (2013.01); *F16D 2023/0631* (2013.01); *F16D 2023/0637* (2013.01)

(58) Field of Classification Search
CPC .................. F16D 23/06; F16D 23/025; F16D 2023/0631; F16D 2023/0637
See application file for complete search history.

(56) References Cited

U.S. PATENT DOCUMENTS

| | | | |
|---|---|---|---|
| 2,521,730 A | 9/1950 | Keese | |
| 3,548,983 A | 12/1970 | Hiraiwa | |
| 4,300,668 A | 11/1981 | Nozawa et al. | |
| 8,104,597 B2 | 1/2012 | Hackl et al. | |
| 8,511,451 B2 | 8/2013 | Ledetzky et al. | |
| 8,528,435 B2 * | 9/2013 | Hackl | F16D 23/06 74/339 |
| 8,733,523 B2 | 5/2014 | Pamminger et al. | |

(Continued)

FOREIGN PATENT DOCUMENTS

| | | |
|---|---|---|
| DE | 1924724 | 11/1969 |
| DE | 2 222 080 | 11/1973 |

(Continued)

*Primary Examiner* — Stacey A Fluhart
(74) *Attorney, Agent, or Firm* — Morgan, Lewis & Bockius LLP

(57) ABSTRACT

A synchronizer of a transmission may include a lower key disposed slidable in a radial direction of a hub; an upper key disposed at an external side of the lower key in the radial direction to be slidable in an axial direction of the hub; a sleeve disposed at an external side of the hub to slide the upper key in the axial direction while being slid in the axial direction thereof, pressing the upper key toward a synchronizer ring; a key spring disposed between the lower key and the hub to press the lower key and the upper key toward an internal surface of the sleeve; and a displacement converting device converting relative displacement generated in a circumferential direction of the hub between the upper key and the lower key into relative displacement of the upper key in axial direction toward the synchronizer ring with respect to the lower key.

11 Claims, 11 Drawing Sheets

(56) References Cited

U.S. PATENT DOCUMENTS

| | | | |
|---|---|---|---|
| 2008/0066568 A1* | 3/2008 | Hackl | F16D 23/06 74/339 |
| 2010/0263979 A1* | 10/2010 | Pamminger | F16D 23/06 192/53.341 |
| 2011/0272234 A1 | 11/2011 | Park | |
| 2017/0343056 A1 | 11/2017 | Horiguchi et al. | |
| 2018/0045252 A1 | 2/2018 | Omori | |
| 2018/0142740 A1 | 5/2018 | Park et al. | |
| 2018/0372167 A1 | 12/2018 | Choi et al. | |

FOREIGN PATENT DOCUMENTS

| | | |
|---|---|---|
| DE | 10 2008 061 967 A1 | 6/2010 |
| DE | 10 2010 005 705 A1 | 7/2011 |
| DE | 10 2015 215 642 A1 | 2/2017 |
| DE | 10 2015 118 879 A1 | 5/2017 |
| EP | 2 475 907 B1 | 3/2016 |
| JP | 2014-029167 A | 2/2014 |
| KR | 10-0379629 B1 | 4/2003 |
| KR | 10-2011-0123967 A | 11/2011 |
| KR | 10-1417529 B1 | 7/2014 |
| KR | 10-1518120 B1 | 5/2015 |
| WO | WO 2011/029490 A1 | 3/2011 |
| WO | WO 2011/029585 A1 | 3/2011 |

* cited by examiner

RADIAL DIRECTION

SYNCHRONIZER OF TRANSMISSION

CROSS REFERENCE TO RELATED APPLICATION

The present application claims priority to Korean Patent Application No. 10-2017-0134225, filed Oct. 16, 2017, the entire contents of which is incorporated herein for all purposes by this reference.

BACKGROUND OF THE INVENTION

Field of the Invention

The present invention relates to a synchronizer of a transmission, and more particularly, to a structure of a synchronizer that may be used in a synchromesh type shifting mechanism.

Description of Related Art

A synchromesh type shifting mechanism is configured so that when a synchronizer ring is pressed with a key by movement, in an axial direction, of a sleeve spline-coupled to a hub, speeds of the hub and the sleeve and a clutch gear are synchronized with each other by frictional force generated between the synchronizer ring and a clutch cone of the clutch gear, such that the sleeve is coupled to the clutch gear, resulting in transferring power between a shifting stage gear connected integrally with the clutch gear and the hub.

In the case in which the movement of the sleeve in the axial direction as described above is performed by an actuator, a capacity of the actuator may be reduced as force required for the movement of the sleeve becomes small.

Furthermore, durability of the respective components configuring the synchromesh type shifting mechanism as described above may be sufficiently secured.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a synchronizer of a transmission in which durability of components configuring a synchromesh type shifting mechanism may be improved, operating force of a sleeve required for a synchronizing action may be reduced to reduce a capacity of an actuator actuating the sleeve, and a bidirectional synchronizing operation may be performed to reduce the number of keys used in a hub.

According to an exemplary embodiment of the present invention, there is provided a synchronizer of a transmission, including: a lower key disposed to be slidable in a radial direction of a hub with respect to the hub; an upper key disposed at an external side of the lower key in the radial direction to be slidable in an axial direction of the hub; a sleeve disposed at an external side of the hub to slide the upper key in the axial direction while being slid in the axial direction thereof, pressing the upper key toward a synchronizer ring; a key spring disposed between the lower key and the hub to press the lower key and the upper key toward an internal surface of the sleeve; and a displacement converting device converting relative displacement generated in a circumferential direction of the hub between the upper key and the lower key into relative displacement of the upper key in the axial direction toward the synchronizer ring with respect to the lower key, wherein an accommodating groove allowing the upper key to be slidable in the axial direction is provided at an external side of the lower key in the radial direction thereof, the accommodating groove may include a first accommodating groove forming accommodating groove inclined surfaces at center portions of both sidewalls and a plurality of second accommodating grooves formed at both sides of the first accommodating groove in the axial direction thereof, a plurality of upper key chamfers protruding to be in surface-contact with the accommodating groove inclined surfaces are provided at four corners of the upper key, and the displacement converting device is implemented by the accommodating groove inclined surfaces and the upper key chamfers.

The upper key chamfers formed at one side of the upper key in the axial direction may be in surface-contact with the accommodating groove inclined surfaces formed at one side of the first accommodating groove in the axial direction thereof, and the upper key chamfers formed at the other side of the upper key in the axial direction may be in surface-contact with the accommodating groove inclined surfaces formed at the other side of the first accommodating groove in the axial direction thereof.

In the case in which the upper key chamfers formed at one side of the upper key in the axial direction and the accommodating groove inclined surfaces are in surface-contact with each other, relative displacement may be generated toward the synchronizer ring facing the other side of the upper key in the axial direction thereof, and in the case in which the upper key chamfers formed at the other side of the upper key in the axial direction and the accommodating groove inclined surfaces are in surface-contact with each other, relative displacement may be generated toward the synchronizer ring facing one side of the upper key in the axial direction thereof.

When the upper key chamfers formed at one side of the upper key in the axial direction enter the first accommodating groove, the upper key chamfers formed at the other side of the upper key in the axial direction may enter the second accommodating groove, and when the upper key chamfers formed at the other side of the upper key in the axial direction enter the first accommodating groove, the upper key chamfers formed at one side of the upper key in the axial direction may enter the second accommodating groove.

Mutual ruggedness structures may be formed at both end portions of the lower key in the circumferential direction between the lower key and the hub so that the lower key is slidable in the radial direction with respect to the hub.

Radial grooves may be formed in both end portions of the lower key in the circumferential direction thereof, and radial protrusions inserted into the radial grooves of the lower key may be formed on the hub, such that the mutual ruggedness structures are formed by the radial grooves and the radial protrusion.

The synchronizer ring may be provided with an upper key rotating groove surrounding both sides of the upper key in the circumferential direction so that the upper key chamfers are in surface-contact with the accommodating groove inclined surfaces by relatively rotating the upper key with respect to the hub and the lower key at the time of relative rotation with respect to the hub generated when the upper key presses the synchronizer ring by the sleeve.

An upper surface of the upper key may be formed in a trapezoidal shape of which a cross section in the axial direction becomes narrow toward an upward direction to be pressed in an internal diameter direction by sliding of the sleeve in the axial direction thereof.

Lower key chamfers of which both end portions in the circumferential direction become narrow toward an internal diameter direction may be provided at both sides of the lower key, and synchronizer inclined surfaces may be provided on the synchronizer ring to be in surface-contact with the lower key chamfers.

The key spring may be a coil spring inserted from the hub into a lower groove of the lower key.

A first length corresponding to a distance by which the first accommodating groove and the second accommodating groove are spaced from each other in the axial direction may be smaller than a second length corresponding to a distance between the upper key and the synchronizer ring in a neutral state, and a third length corresponding to a sum of the first length and a length of the accommodating groove inclined surface in the axial direction may be smaller than a fourth length corresponding to a distance by which the plurality of upper key chamfers are spaced from each other in the axial direction thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
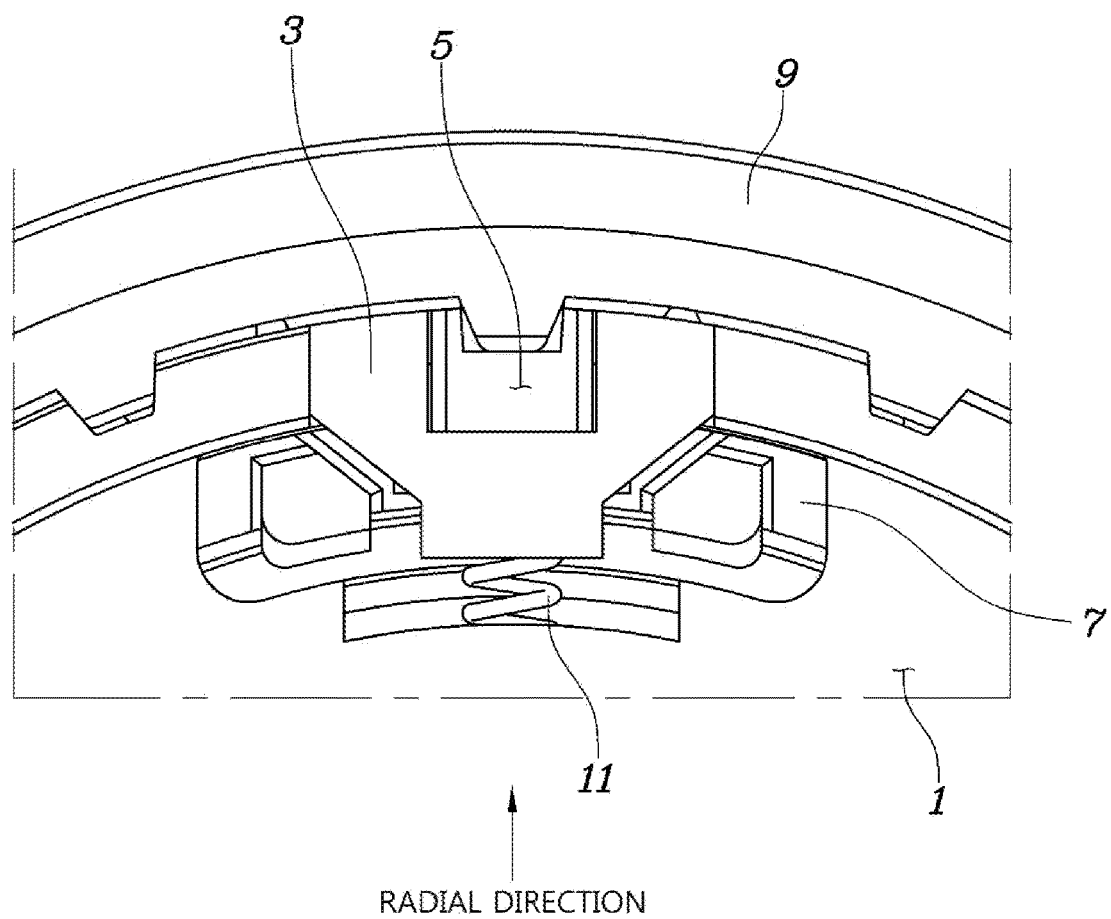
FIG. 1 is a view illustrating a structure of a synchronizer of a transmission according to an exemplary embodiment of the present invention and illustrating a synchronizer ring when viewed from a hub in an axial direction thereof.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a synchronizer of a transmission according to an exemplary embodiment of the present invention will be described with reference to the accompanying drawings.

Figure 2:
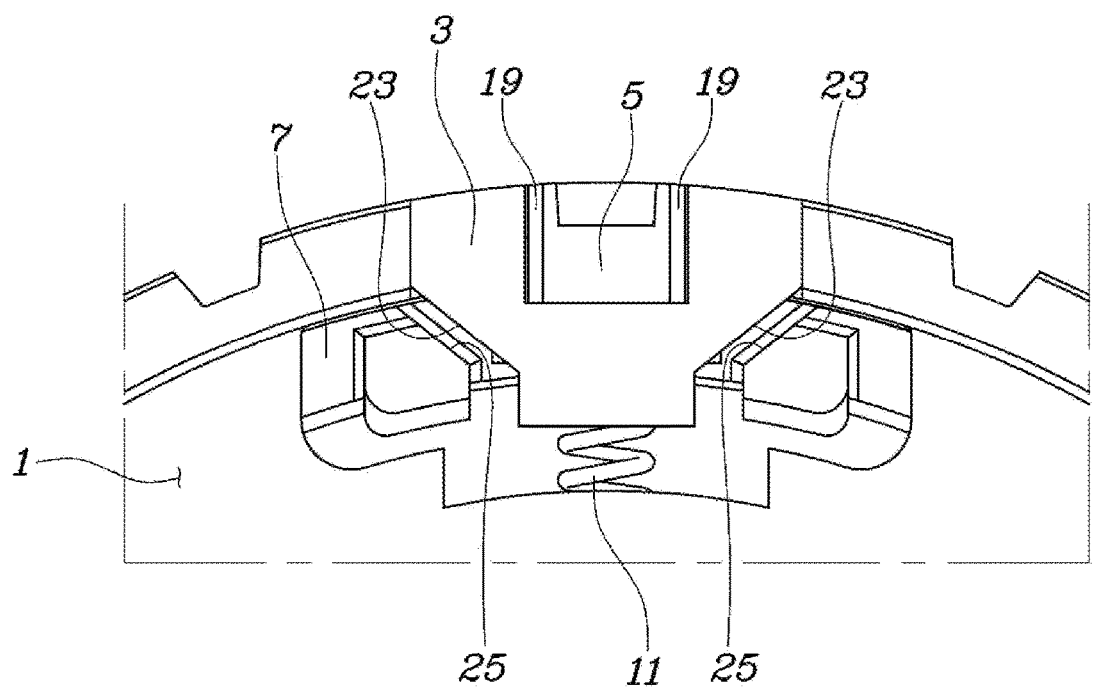
FIG. 2 is a view illustrating a state in which a sleeve and a clutch gear are removed from FIG. 1.
Figure 3:
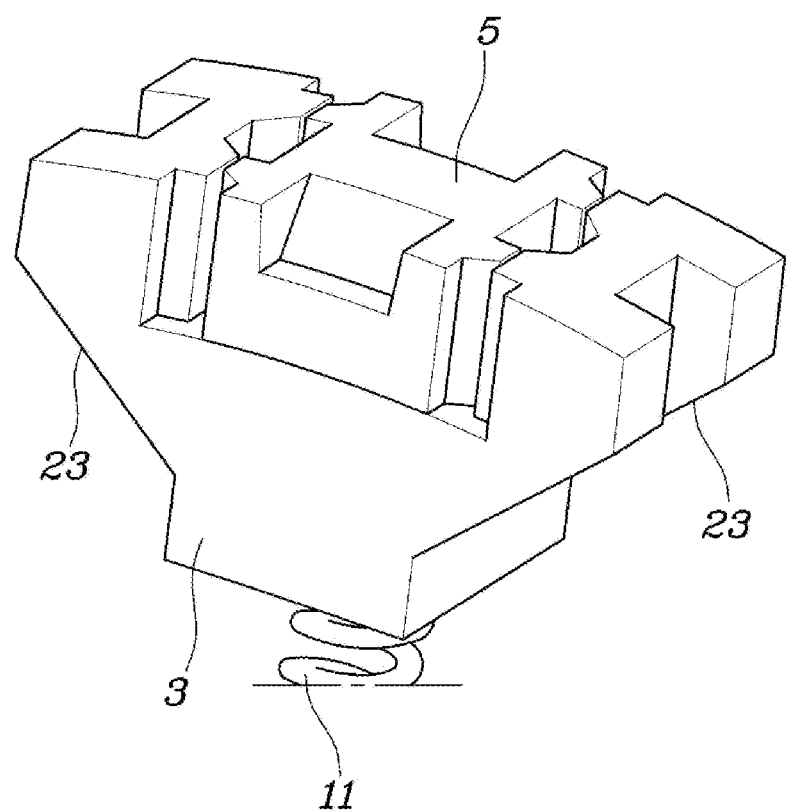
FIG. 3 is a view illustrating a lower key, an upper key, and a key spring of FIG. 1, when viewed from an opposite direction of FIG. 2.
Figure 4:
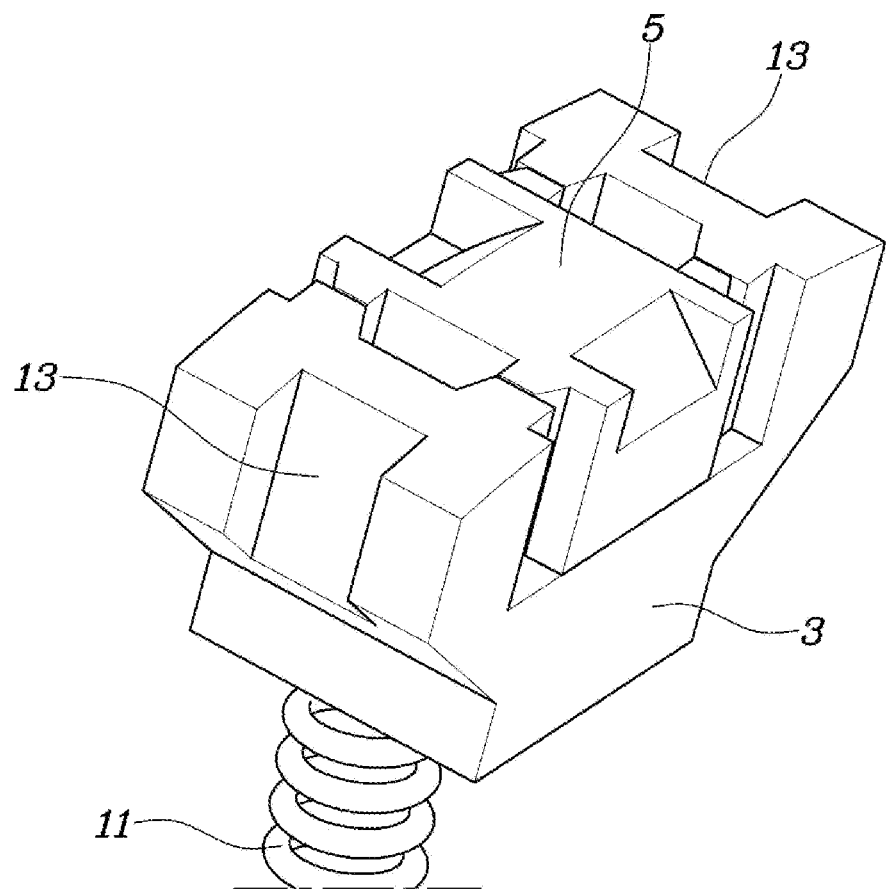
FIG. 4 is a view illustrating the lower key, the upper key, and the key spring of FIG. 2 when viewed from another angle.
Figure 5:
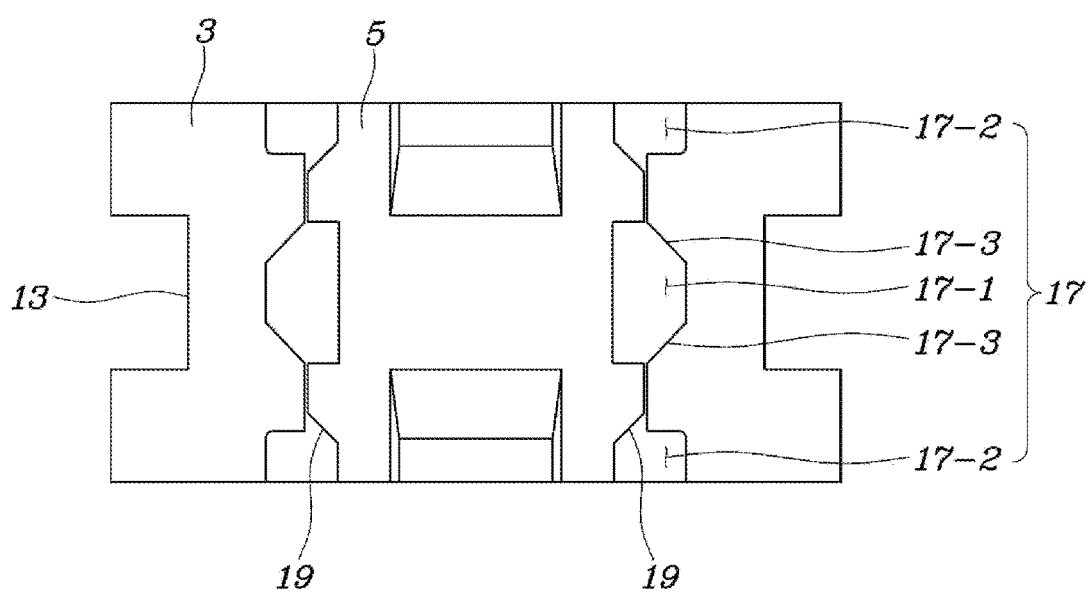
FIG. 5 is a view illustrating the lower key and the upper key when viewed from an external side of a hub in a radial direction thereof.

FIG. 1 is a view illustrating a structure of a synchronizer of a transmission according to an exemplary embodiment of the present invention and illustrating a synchronizer ring when viewed from a hub in an axial direction thereof, FIG. 2 is a view illustrating a state in which a sleeve and a clutch gear are removed from FIG. 1, FIG. 3 is a view illustrating a lower key, an upper key, and a key spring of FIG. 1, when viewed from an opposite direction of FIG. 2, FIG. 4 is a view illustrating the lower key, the upper key, and the key spring of FIG. 2 when viewed from another angle, FIG. 5 is a view illustrating the lower key and the upper key when viewed from an external side of a hub in a radial direction thereof, and FIG. 6, FIG. 7, FIG. 8, FIG. 9, FIG. 10, and FIG. 11 are views for sequentially describing actions of the synchronizer according to an exemplary embodiment of the present invention.

Referring to FIGS. 1 to 11, the synchronizer of a transmission according to an exemplary embodiment of the present invention is configured to include a lower key 3 disposed to be slidable in a radial direction of a hub 1 with respect to the hub 1; an upper key 5 disposed at an external side of the lower key 3 in the radial direction to be slidable in an axial direction of the hub 1; a sleeve 9 disposed at an external side of the hub 1 to slide the upper key 5 in the axial direction while being slid in the axial direction thereof, pressing the upper key 5 toward a synchronizer ring 7; a key spring 11 disposed between the lower key 3 and the hub 1 to press the lower key 3 and the upper key 5 toward an internal surface of the sleeve 9; and a displacement converting device converting relative displacement generated in a circumferential direction of the hub 1 between the upper key 5 and the lower key 3 into relative displacement of the upper key 5 in the axial direction toward the synchronizer ring 7 with respect to the lower key 3.

That is, in an exemplary embodiment of the present invention, at the time of performing shifting, when the sleeve 9 slides the upper key 5 toward the synchronizer ring 7 while being slid from a neutral state in the axial direction by an actuator, or the like, the upper key 5 is further pressed toward the synchronizer ring 7 by the displacement converting device, such that the hub 1 and the sleeve 9 are synchronized with the synchronizer ring 7 and a clutch gear. Therefore, the lower key 3 moves in an internal diameter direction thereof, such that indexing is conducted. In the instant case, the sleeve 9 is engaged with the clutch gear, such that the shifting is performed.

Mutual ruggedness structures are formed at both end portions of the lower key 3 in the circumferential direction between the lower key 3 and the hub 1 so that the lower key 3 is slidable in the radial direction with respect to the hub 1.

In the exemplary embodiment of the present invention, radial grooves 13 are formed in both end portions of the lower key 3 in the circumferential direction thereof, and radial protrusions 15 inserted into the radial grooves 13 of the lower key 3 are formed on the hub 1, such that the mutual ruggedness structures are formed by the radial grooves 13 and the radial protrusion 15.

In the mutual ruggedness structures, a configuration in which protrusions are formed on the lower key 3 and grooves are formed to the hub 1 is also possible, and a configuration in which the numbers of protrusions and grooves are different from each other is also possible.

in the synchronizer of a transmission according to an exemplary embodiment of the present invention, an accommodating groove 17 allowing the upper key 5 to be slidable in the axial direction is provided at an external side of the lower key 3 in the radial direction thereof, the accommodating groove 17 includes a first accommodating groove 17-1 forming accommodating groove inclined surfaces 17-3 at center portions of both sidewalls and a plurality of second accommodating grooves 17-2 formed at both sides of the first accommodating groove 17-1 in the axial direction thereof, a plurality of upper key chamfers 19 protruding to be in surface-contact with the accommodating groove inclined surfaces 17-3 are provided at four corners of the upper key 5, and the displacement converting device is implemented by the accommodating groove inclined surfaces 17-3 and the upper key chamfers 19.

That is, the upper key 5 is disposed to be relatively movable in the axial direction with respect to the lower key 3, and is designed to be relatively movable in the circumferential direction within a slight range.

Furthermore, the upper key chamfers 19 are formed at the four corners of the upper key 5, such that the upper key chamfers 19 and the accommodating groove inclined surfaces 17-3 may perform displacement conversion by being in surface-contact with each other in all the situations in which the upper key 5 moves to one side or the other side in the axial direction by the sleeve 9.

Meanwhile, the synchronizer ring 7 is provided with an upper key rotating groove 21 surrounding both sides of the upper key 5 in the circumferential direction so that the upper key chamfers 19 are in surface-contact with the accommodating groove inclined surfaces 17-3 by relatively rotating the upper key 5 with respect to the hub 1 and the lower key 3 at the time of relative rotation with respect to the hub 1 generated when the upper key 5 presses the synchronizer ring 7 by the sleeve 9.

Therefore, when the upper key 5 presses the synchronizer ring 7 by sliding of the sleeve 9 in the axial direction thereof, such that the upper key rotating groove 21 rotates the upper key 5 toward one side in the circumferential direction thereof, the upper key chamfers 19 are in surface-contact the accommodating groove inclined surfaces 17-3, and displacement of the upper key 5 in the circumferential direction with respect to the lower key 3 generated at the time of such a surface-contact is converted into relative displacement in the axial direction further pressing the upper key 5 to the synchronizer ring 7. As a result, an effect of pressing the upper key 5 to the synchronizer ring 7 by force greater than force acting on the sleeve 9 by the actuator is generated. Therefore, even though an actuator having a relatively small capacitor is used, a sufficient synchronizing action required for shifting may be conducted.

Here, the upper key chamfers 19 formed at one side of the upper key 5 in the axial direction are in surface-contact with the accommodating groove inclined surfaces 17-3 formed at one side of the first accommodating groove 17-1 in the axial direction thereof, and the upper key chamfers 19 formed at the other side of the upper key 5 in the axial direction are in surface-contact with the accommodating groove inclined surfaces 17-3 formed at the other side of the first accommodating groove 17-1 in the axial direction thereof.

in the case in which the upper key chamfers 19 formed at one side of the upper key 5 in the axial direction and the accommodating groove inclined surfaces 17-3 are in surface-contact with each other, relative displacement is generated toward the synchronizer ring 7 facing the other side of the upper key 5 in the axial direction thereof, and in the case in which the upper key chamfers 19 formed at the other side of the upper key 5 in the axial direction and the accommodating groove inclined surfaces 17-3 are in surface-contact with each other, relative displacement is generated toward the synchronizer ring 7 facing one side of the upper key 5 in the axial direction thereof.

Furthermore, when the upper key chamfers 19 formed at one side of the upper key 5 in the axial direction enter the first accommodating groove 17-1, the upper key chamfers 19 formed at the other side of the upper key 5 in the axial direction enter the second accommodating groove 17-2, and when the upper key chamfers 19 formed at the other side of the upper key 5 in the axial direction enter the first accommodating groove 17-1, the upper key chamfers 19 formed at one side of the upper key 5 in the axial direction enter the second accommodating groove 17-2.

The second accommodating groove 17-2 is formed in only a structure that the upper key chamfers 19 may enter, but does not other acting force to the upper key chamfers 19.

An upper surface of the upper key 5 is formed in a trapezoidal shape of which a cross section in the axial direction becomes narrow toward an upward direction to be pressed in the internal diameter direction by the sliding of the sleeve 9 in the axial direction thereof.

This is to allow the sleeve 9 to press and slide the upper key 5 in the axial direction in an early state in which the sleeve 9 moves from a neutral state in the axial direction thereof, and allow the sleeve 9 to be easily coupled to the clutch gear while moving the upper key 5 in the internal diameter direction after synchronization is made.

For reference, the neutral state indicates a state in which the sleeve 9 is aligned with the hub 1 without being biased toward any shifting stage gear when separate shifting stage gears exist, respectively, at both sides of the sleeve 9 and the hub 1, and is used the same meaning as a general concept in the related art.

Lower key chamfers 23 of which both end portions in the circumferential direction become narrow toward the internal diameter direction are provided at both sides of the lower key, and synchronizer inclined surfaces 25 are provided on the synchronizer ring 7 to be in surface-contact with the lower key chamfers 23.

Therefore, when the hub 1 and the sleeve 9 are synchronized with the synchronizer ring 7 and the clutch gear 19, the lower key 3 moves in the internal diameter direction by pressure that the sleeve 9 applies in the internal diameter direction of the hub 1 through the upper key 5, such that lower key chamfers 23 are slid with respect to the synchronizer inclined surfaces 25. Therefore, indexing may be conducted to allow the sleeve 9 to be engaged with the clutch gear 19 beyond the synchronizer ring 7.

The key spring 11 is a coil spring inserted from the hub 1 into a lower groove 27 of the lower key 3.

Since only force by which the lower key 3 slides in the radial direction with respect to the hub 1 is applied to the coil spring during the movement of the sleeve 9, the upper key 5, and the lower key 3 as described above, buckling or bending is not generated in the coil spring, and only an expansion and contraction action of the coil spring in a longitudinal direction is performed depending on a design intention, such that durability of the coil spring is sufficiently ensured.

Actions of the synchronizer of a transmission according to an exemplary embodiment of the present invention will be described with reference to FIG. 6, FIG. 7, FIG. 8, FIG. 9, FIG. 10, and FIG. 11.

Figure 6:
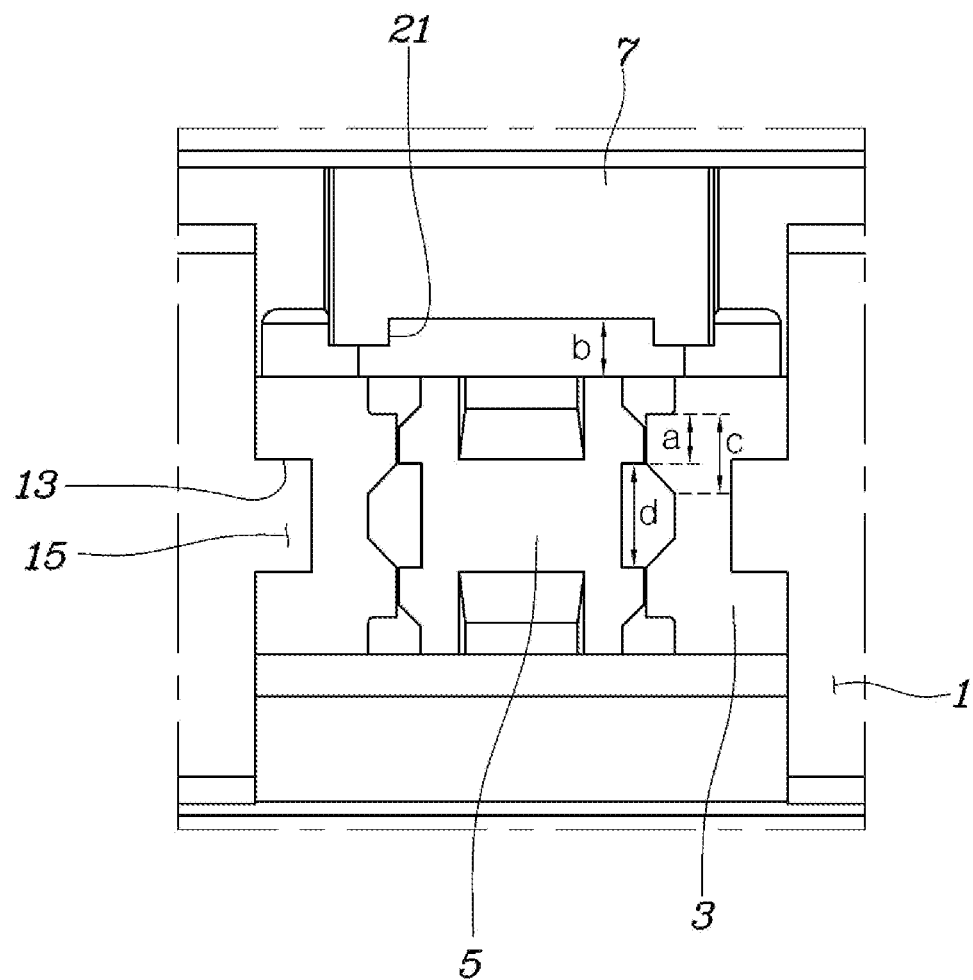
FIG. 6, FIG. 7, FIG. 8, FIG. 9, FIG. 10, and FIG. 11 are views for sequentially describing actions of the synchronizer according to an exemplary embodiment of the present invention.

FIG. 6 illustrates an initial state in which the sleeve starts to move the upper key 5 toward the synchronizer ring 7 while being slid in the axial direction thereof.

Figure 7:
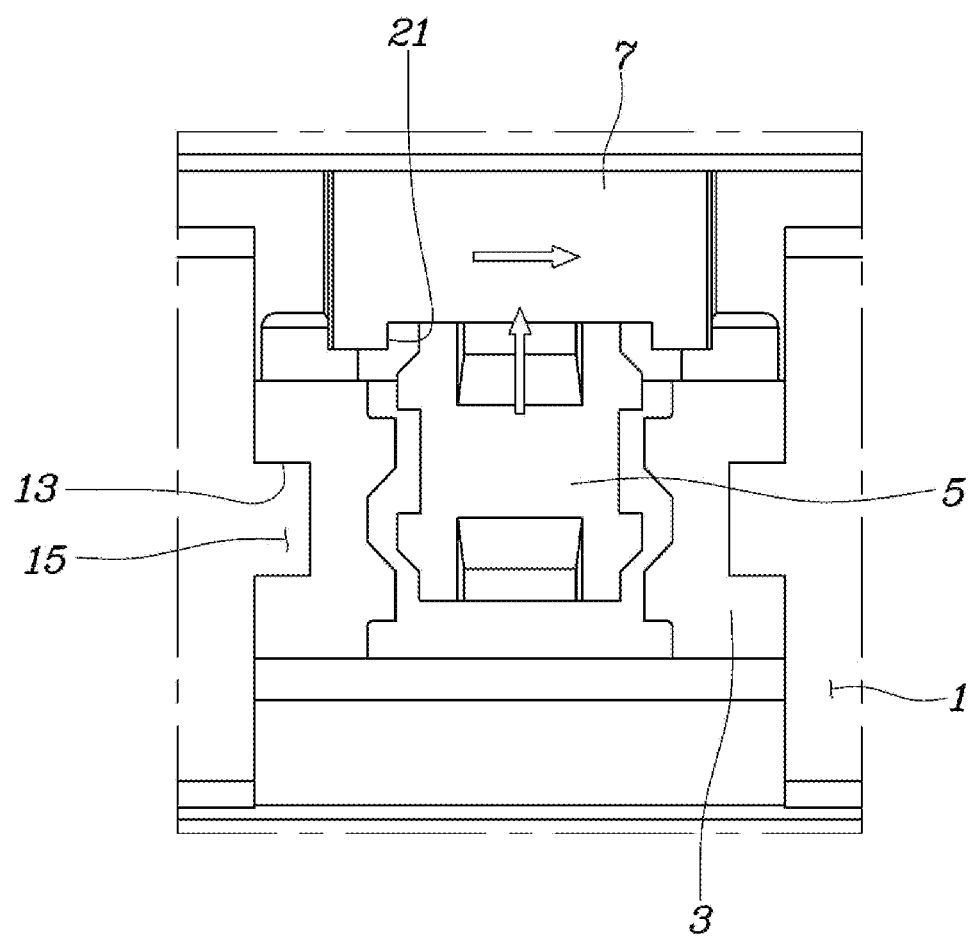

FIG. 7 illustrates that the upper key 5 presses the synchronizer ring 7 in the axial direction thereof, such that a clutch cone of the clutch gear 19 and the synchronizer ring 7 are in contact with each other to generate a torque rotating the synchronizer ring 7 with respect to the hub 1, and a synchronizing action thus starts.

Figure 8:
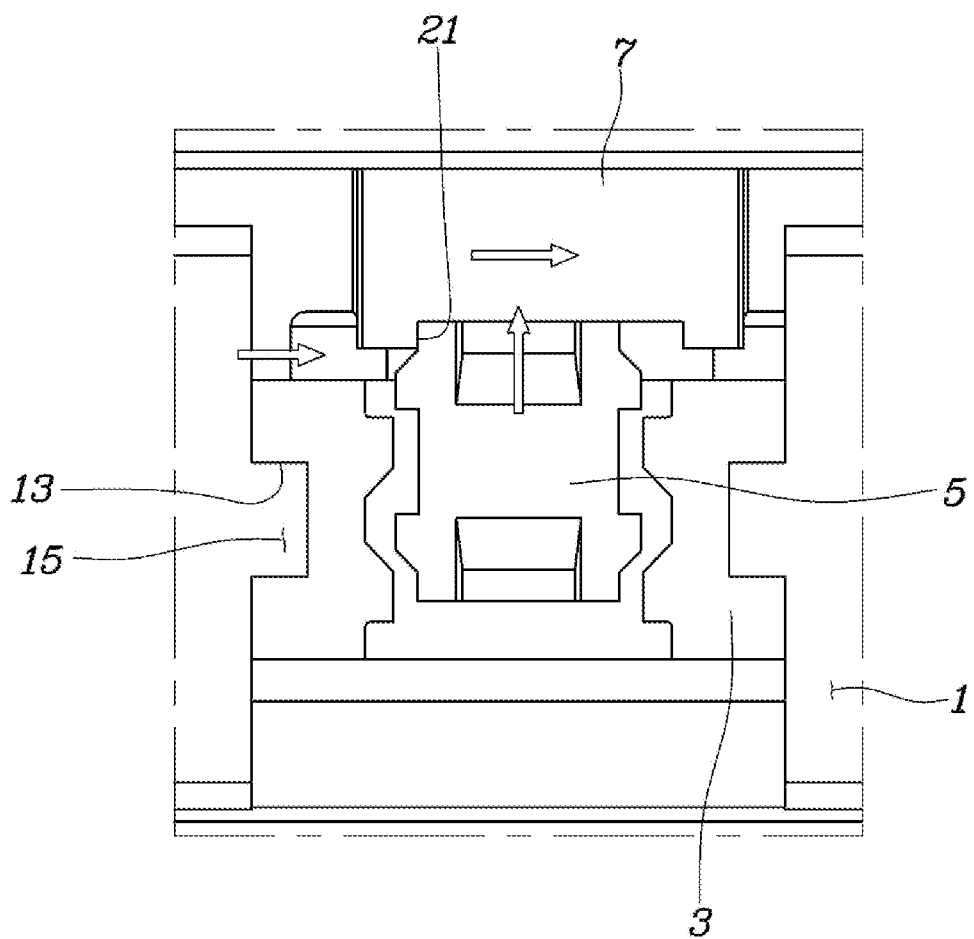

FIG. 8 illustrates a state in which the synchronizer ring 7 starts to move the upper key 5 to the upper key rotating groove 21 in the circumferential direction by the torque acting on the synchronizer ring 7.

Figure 9:
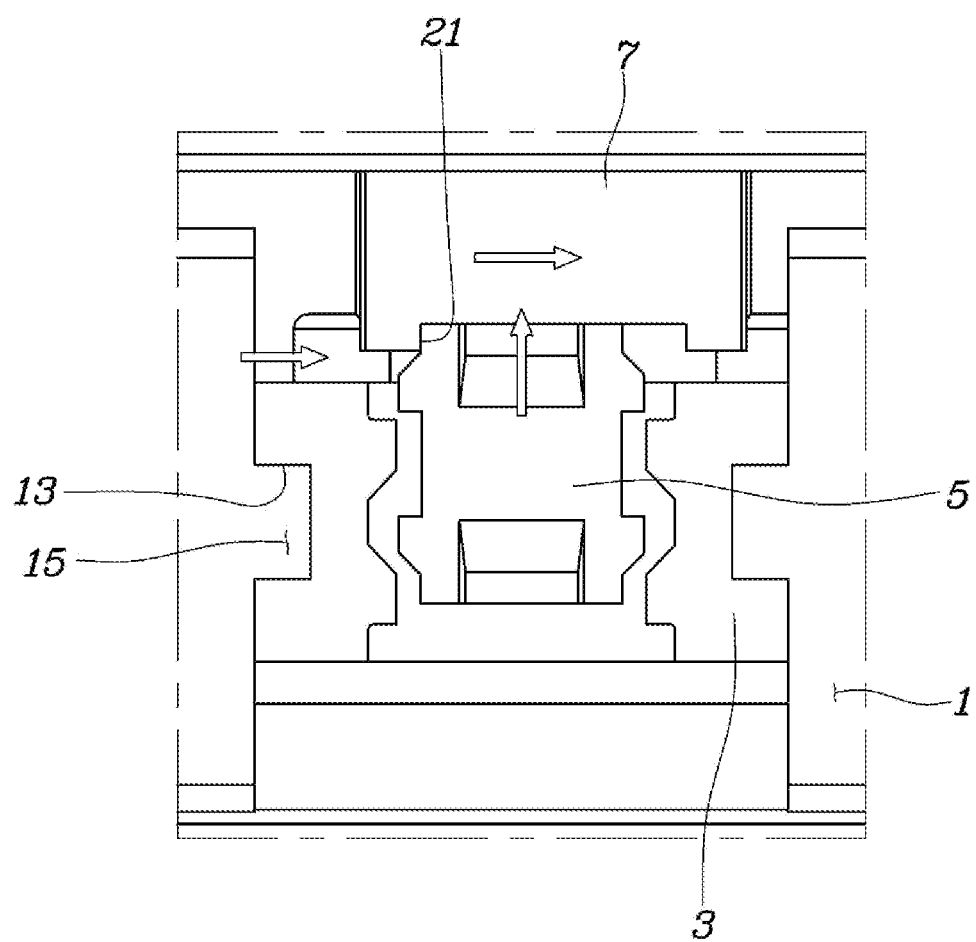

FIG. 9 illustrates a state in which the upper key chamfers 19 of the upper key 5 are in surface-contact with the accommodating groove inclined surfaces 17-3, such that the displacement of the upper key 5 in the circumferential direction is converted into the displacement in the axial direction thereof, furthering pressing the synchronizer ring 7.

Figure 10:
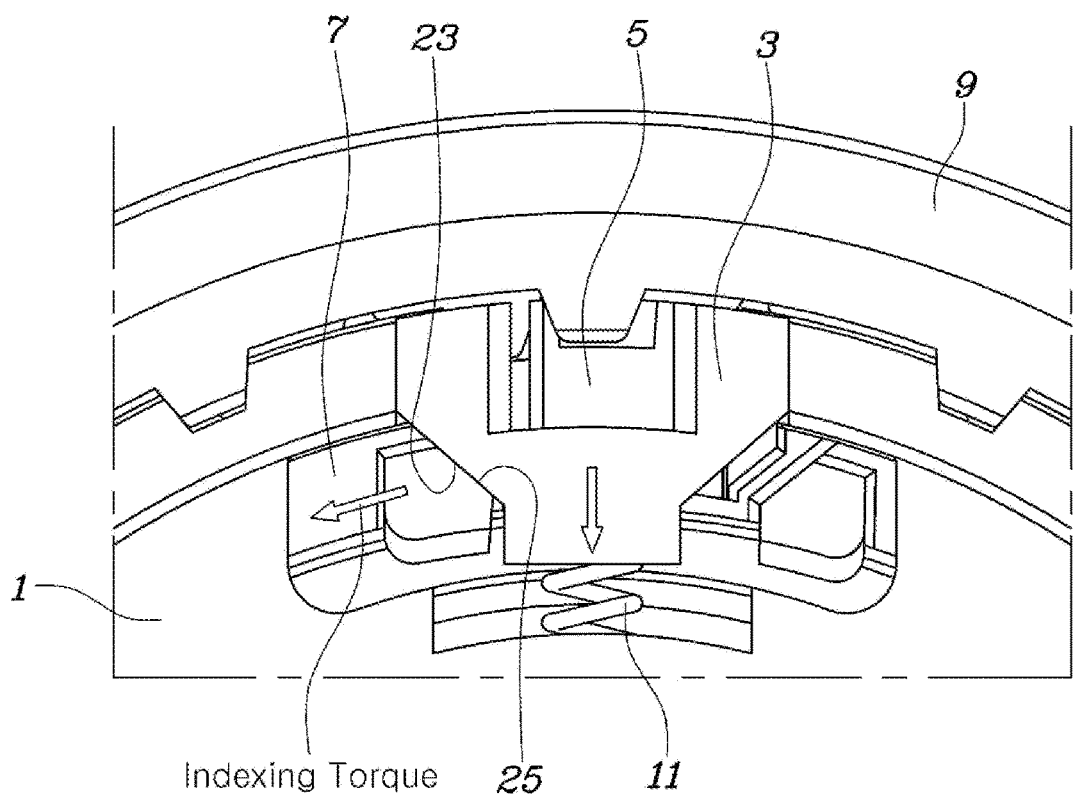
Figure 11:
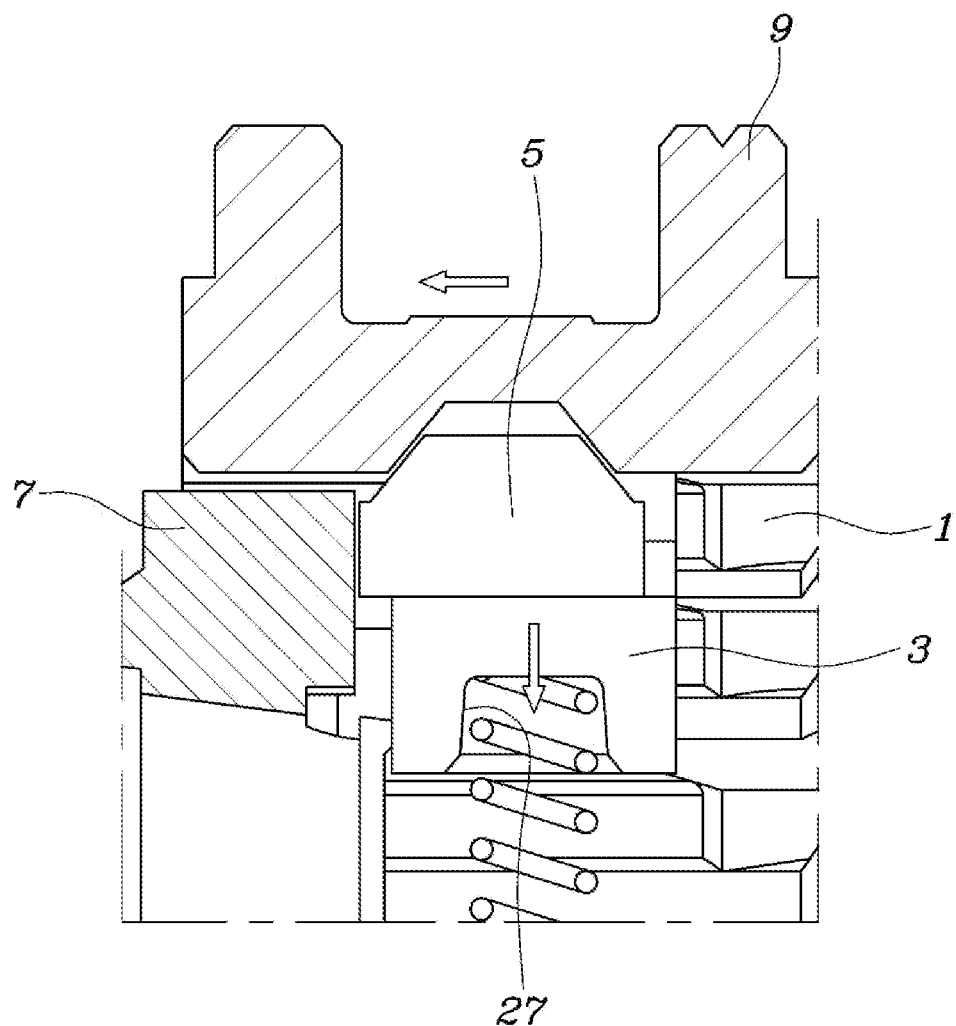

When the upper key 5 presses the synchronizer ring 7 as described above to synchronize the synchronizer ring 7 with the clutch gear 19, the sleeve 9 gradually moves the upper key 5 in the internal diameter direction thereof, as illustrated in FIG. 10, and FIG. 11. Therefore, the lower key chamfers 23 are slid with respect to the synchronizer inclined surfaces 25 while the lower key 3 moving in the internal diameter direction thereof, resulting in aligning the synchronizer ring 7 with respect to the sleeve 9 and the hub 1. Therefore, an indexing torque allowing the sleeve 9 to approach the clutch gear 19 beyond the upper key 5 acts on the synchronizer ring 7, the indexing is conducted, and the sleeve 9 continuously advances to be finally engaged with the clutch gear 19, such that a shifting action is completed.

Referring to FIG. 6, in the synchronizer of a transmission according to an exemplary embodiment of the present invention, a first length a corresponding to a distance by which the first accommodating groove 17-1 and the second accommodating groove 17-2 are spaced from each other in the axial direction is smaller than a second length b corresponding to a distance between the upper key and the synchronizer ring 7 in the neutral state (a<b).

Furthermore, a third length c corresponding to the sum of the first length a and a length of the accommodating groove inclined surface 17-3 in the axial direction is smaller than a fourth length d corresponding to a distance by which the plurality of upper key chamfers 19 are spaced from each other in the axial direction (c<d).

Here, when the upper key 5 is in the neutral state, the plurality of upper key chamfers 19 are positioned to correspond to a protruding shape between the first accommodating groove 17-1 and the second accommodating groove 17-2 of the lower key 3.

Therefore, since the second length b is greater than the first length a, the upper key 5 slides from the neutral state to one side in the axial direction thereof, such that the upper key chamfers 19 formed at one side of the upper key 5 may be positioned in a position at which they may enter the second accommodating groove 17-2 before the upper key 5 is in contact with the synchronizer ring 7.

Furthermore, since the fourth length d is greater than the third length c, the upper key 5 slides from the neutral state to the other one side in the axial direction thereof, such that the upper key chamfers 19 formed at the other side of the upper key 5 may be positioned in a position at which they may enter the second accommodating groove 17-2 before inclined surfaces of the upper key chamfers 19 formed at one side of the upper key 5 surface the accommodating groove inclined surfaces 17-3 of the first accommodating groove 17-1.

According to the synchronizer of a transmission formed in the structure as described above, durability of components configuring a synchromesh type shifting mechanism may be improved, and operating force of the sleeve required for the synchronizing action may be reduced to reduce a capacity of the actuator actuating the sleeve.

Furthermore, the components configuring the synchromesh type shifting mechanism may be designed to perform a bidirectional synchronizing operation to reduce the number of keys used in the hub, reducing a weight, a cost, and a volume of the synchronizer of a transmission.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizer of a transmission, comprising:
   a lower key disposed to be slidable in a radial direction of a hub with respect to the hub;
   an upper key disposed at an external side of the lower key in the radial direction to be slidable in an axial direction of the hub;
   a sleeve disposed at an external side of the hub to slide the upper key in the axial direction while being slid in the axial direction, pressing the upper key toward a synchronizer ring;
   a key spring disposed between the lower key and the hub to press the lower key and the upper key toward an internal surface of the sleeve; and
   a displacement converting device converting relative displacement generated in a circumferential direction of the hub between the upper key and the lower key into relative displacement of the upper key in the axial direction toward the synchronizer ring with respect to the lower key,
   wherein an accommodating groove allowing the upper key to be slidable in the axial direction is provided at the external side of the lower key in the radial direction, the accommodating groove includes a first accommodating groove forming accommodating groove inclined surfaces at center portions of first and second sidewalls and a plurality of second accommodating grooves formed at a first side and a second side of the first accommodating groove in the axial direction, a plurality of upper key chamfers protruding to be in contact with the accommodating groove inclined surfaces are provided at four corners of the upper key, and the displacement converting device is implemented by the accommodating groove inclined surfaces and the upper key chamfers.

2. The synchronizer of the transmission of claim 1, wherein the upper key chamfers formed at a first side of the upper key in the axial direction are in contact with the accommodating groove inclined surfaces formed at the first side of the first accommodating groove in the axial direction thereof, and the upper key chamfers formed at a second side of the upper key in the axial direction are in contact with the accommodating groove inclined surfaces formed at the second side of the first accommodating groove in the axial direction.

3. The synchronizer of the transmission of claim 2, wherein when the upper key chamfers formed at the first side of the upper key in the axial direction and the accommodating groove inclined surfaces are in contact with each other, relative displacement is generated toward the synchronizer ring facing the second side of the upper key in the axial direction, and when the upper key chamfers formed at the second side of the upper key in the axial direction and the accommodating groove inclined surfaces are in contact with each other, relative displacement is generated toward the synchronizer ring facing the first side of the upper key in the axial direction.

4. The synchronizer of the transmission of claim 3, wherein a first length corresponding to a distance by which the first accommodating groove and the second accommodating groove are spaced from each other in the axial direction is smaller than a second length corresponding to a distance between the upper key and the synchronizer ring in a neutral state, and a third length corresponding to a sum of the first length and a length of the accommodating groove inclined surface in the axial direction is less than a fourth length corresponding to a distance by which the plurality of upper key chamfers are spaced from each other in the axial direction.

5. The synchronizer of the transmission of claim 2, wherein, when the upper key chamfers formed at the first side of the upper key in the axial direction enter the first accommodating groove, the upper key chamfers formed at the second side of the upper key in the axial direction enter the second accommodating groove, and when the upper key chamfers formed at the second side of the upper key in the axial direction enter the first accommodating groove, the upper key chamfers formed at the first side of the upper key in the axial direction enter the second accommodating groove.

6. The synchronizer of the transmission of claim 1, wherein mutual ruggedness structures are formed at first and second end portions of the lower key in the circumferential direction between the lower key and the hub so that the lower key is slidable in the radial direction with respect to the hub.

7. The synchronizer of the transmission of claim 6, wherein radial grooves are formed in the first and second end portions of the lower key in the circumferential direction, and radial protrusions inserted into the radial grooves of the lower key are formed on the hub, and wherein the mutual ruggedness structures are formed by the radial grooves and the radial protrusions.

8. The synchronizer of the transmission of claim 1, wherein the synchronizer ring is provided with an upper key rotating groove surrounding a first side and a second side of the upper key in the circumferential direction wherein the upper key chamfers are in contact with the accommodating groove inclined surfaces by relatively rotating the upper key with respect to the hub and the lower key at a time of relative rotation with respect to the hub generated when the upper key presses the synchronizer ring by the sleeve.

9. The synchronizer of the transmission of claim 8, wherein an upper surface of the upper key is formed in a trapezoidal shape of which a cross section in the axial direction are narrow toward an upward direction thereof to be pressed in an internal diameter direction by sliding of the sleeve in the axial direction.

10. The synchronizer of the transmission of claim 8, wherein lower key chamfers of which first and second end portions in the circumferential direction is narrow toward an internal diameter direction are provided at a first side and a second side of the lower key, and synchronizer inclined surfaces are provided on the synchronizer ring to be in contact with the lower key chamfers.

11. The synchronizer of the transmission of claim 1, wherein the key spring is a coil spring inserted from the hub into a lower groove of the lower key.

* * * * *